United States Patent [19]

Walker

[11] Patent Number: 4,545,002

[45] Date of Patent: Oct. 1, 1985

[54] THYRISTOR VOLTAGE LIMITER FOR CURRENT SOURCE INVERTER

[75] Inventor: Loren H. Walker, Salem, Va.

[73] Assignee: General Electric Company, Salem, Va.

[21] Appl. No.: 508,712

[22] Filed: Jun. 28, 1983

[51] Int. Cl.$^4$ .................. H02H 7/22; H02P 13/24
[52] U.S. Cl. .................. 363/37; 318/801; 363/51
[58] Field of Search .................. 318/801, 802, 803; 323/207; 363/35, 37, 51, 58, 96

[56] References Cited

U.S. PATENT DOCUMENTS

| | | | |
|---|---|---|---|
| 3,683,264 | 8/1972 | Schieman et al. | 321/14 |
| 4,183,081 | 1/1980 | Cutler et al. | 363/81 |
| 4,237,531 | 12/1980 | Cutler et al. | 363/58 |
| 4,251,763 | 2/1981 | Walker et al. | 318/803 |

OTHER PUBLICATIONS

"Reactive Power Generation and Control by Thyristor Circuits" by Laszlo Gyugyi, IEEE Transactions on Industry Publications, vol. 1A-15, No. 5, Sep./Oct. 1979, pp. 521-532—see especially 524-525.

Primary Examiner—Peter S. Wong
Assistant Examiner—D. L. Rebsch
Attorney, Agent, or Firm—Arnold F. Renner

[57] ABSTRACT

A voltage limiter for protecting the thyristors of a current source inverter, also known as a controlled current inverter, wherein the limiter includes a circuit for sensing the respective voltages directly across at least one but preferably across each of the thyristors in the inverter and generating a signal corresponding to the highest value and a regulator circuit which is operable in response to the difference between the highest value signal and a reference signal corresponding to a safe operating voltage for the thyristors in the inverter, to modify the thyristor gating angle of those thyristors which control the current in the inverter. The voltage limiter thus reduces the current carried by the inverter thyristors when the highest voltage across the inverter thyristors exceeds the reference signal, and thereby reduces the amplitude of any commutating spike voltage in the voltage applied across the thyristors. This permits full utilization of the inverter rating while requiring no adjustment for source impedance, line voltage, or commutating capacitance.

35 Claims, 7 Drawing Figures

THYRISTOR VOLTAGE LIMITER FOR CURRENT SOURCE INVERTER

CROSS REFERENCE TO RELATED APPLICATIONS

This application is related to the following applications, which are assigned to the assignee of the present invention and which are herein meant to be incorporated by reference:

U.S. Pat. No. 4,496,899, "Control For A Force Commutated Current Source VAR Generator", issued Jan. 29, 1985, in the name of Loren H. Walker and David L. Lippitt; and U.S. Ser. No. 508,711, entitled, "Capacitance Control For A Static VAR Generator", filed on June 28, 1983, in the name of Loren H. Walker.

BACKGROUND OF THE INVENTION

This invention relates generally to current source inverters, also known as controlled current inverters, and more particularly to a method and means for limiting the voltage on the thyristors of a current source thyristor inverter.

In U.S. Pat. No. 4,230,979, entitled, "Controlled Current Inverter And Motor Control System", issued to Paul M. Espelage, et al. on Oct. 28, 1980, and assigned to the present assignee, there is disclosed a typical example of a current source inverter motor drive system including a thyristor type current source inverter.

The peak voltage on the thyristors of a current source inverter is proportional to the sum of the peak value of the sinusoidal voltage applied to the alternating current (AC) terminals of the inverter and the value of direct current (DC) commutated by the inverter. Prior art techniques utilized for limiting this voltage include power level clamps or surge suppressors to limit these voltages by force, or by the use of signal level methods to predict this voltage and thereafter limit current to a value which will not produce excessive voltage. U.S. Pat. No. 4,237,531, entitled, "Controlled Current Inverter System Having Semiconductor Overvoltage Protection", issuing to John H. Cutler and Loren H. Walker on Dec. 2, 1980, and assigned to the present assignee, describes not only a controlled current thyristor inverter, but also describes a predictive method and apparatus which transiently interrupts operation of the inverter when overvoltages across the thyristors are predicted. The inventive concept of U.S. Pat. No. 4,237,531 is applicable to thyristors of current source inverters whether used in motor drives as described in U.S. Pat. No. 4,230,979, or in var generators as described in the aforementioned U.S. Pat. No. 4,496,899. The only difference between motor drive and var controller applications is that in the case of the var generator, the thyristors which control the current are the same ones being protected. In an AC motor drive system, the inverter thyristors on the motor side of a DC link, coupling AC to DC source side converter and the motor side DC to AC inverter, are protected by changing the gating time; i.e., the firing angle of the thyristors in the converter connected to the source of AC power, due to the fact that the source side thyristors are the means by which current is controlled.

SUMMARY OF THE INVENTION

It is, therefore, an object of the present invention to provide an improvement in current source inverters and their method of operation.

It is a further object to provide an improvement in the control of current source thyristor inverters also known as controlled current inverters.

It is another object of the invention to provide an improved control of a current source inverter operating as a var generator.

It is still another object of the invention to provide an improved control of a current source inverter operating in a motor drive system.

A still further object is to provide a current source inverter which protects against overvoltage conditions as a function of load voltage, current and electrical parameters of the load.

It is yet another object to provide a current source thyristor inverter having means to protect the thyristors from overvoltage conditions.

The foregoing and other objects are achieved, in accordance with the present invention, by measuring the voltage(s) across one or more but preferably each of the individual thyristors of a current source inverter, including any commutating spike voltage, comparing it to a predetermined limit level in the form of a reference voltage and controlling the DC current level so that this voltage does not exceed this limit level. Control of current is achieved by regulating the gating angle of the thyristors which control current in response to the error between inverter thyristor voltage and the reference voltage. Such a control is not only fast acting, but overrides all other controls which attempt to determine current. The advantages of this approach over other known approaches is that it involves no prediction, either of height or phase position of the commutating spike voltage. Thus a motor drive or var generator implemented with current source inverter may be operated smoothly to the limits of thyristor voltage capability, without abrupt transients when this limit is reached and without margins normally required where spike voltage amplitude or phase position are estimated.

BRIEF DESCRIPTION OF THE DRAWING

While the present invention is defined in the claims annexed to and forming a part of this specification, a better understanding of the invention can be had by reference to the following description taken in conjunction with the accompanying drawings in which:

DETAILED DESCRIPTION OF THE PREFERRED EMBODIMENTS

Figure 1:
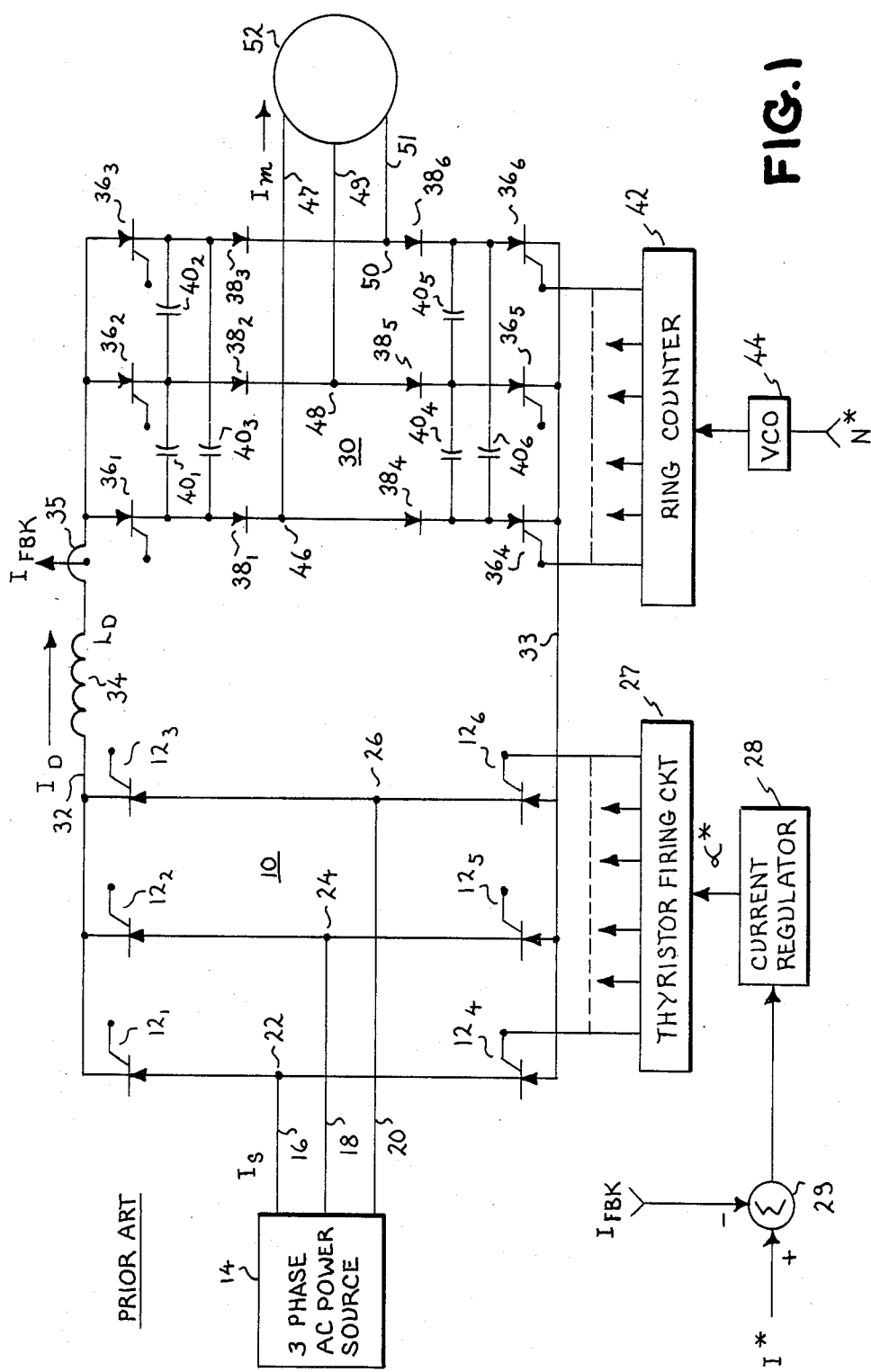
FIG. 1 is an electrical schematic diagram of a basic current source thyristor inverter utilized in a motor drive system in accordance with the known prior art.

Referring now to the drawings and more particularly to FIG. 1, reference numeral 10 denotes a variable direct current (DC) source which comprises an AC to DC converter including a three phase bridge including six thyristors $12_1$ through $12_6$ which are coupled to and receive alternating current (AC) power from a three phase power source 14 by way of the power lines 16, 18 and 20 connected to bridge circuit junctions 22, 24 and 26. The term thyristor will be used in the remaining portion of this description and is to be expressly understood that this term is used in a generic sense to connote controlled rectifiers generally. As is known in the prior art, the output of the thyristor converter 10 can be made a function of the times at which the thyristors $12_1$ through $12_6$ of the bridge arrangement are gated on with respect to the applied voltage and which is commonly known as phase controlling. The control of thyristors $12_1$ through $12_6$ is a function of gating signals applied to the respective gate electrodes which are supplied from a thyristor firing circuit 27 (only two such connections being shown for sake of simplicity) which is operable to sequentially fire the thyristors at a predetermined delay angle α, measured from the earliest point of natural commutation and which comprises the zero crossing points of the line to line voltages across the lines 16, 18 and 20. The thyristor firing circuit 27, moreover, operates in a well known manner in response to the output of a current regulator circuit 28.

The current regulator circuit 28 typically comprises a proportional plus integral type controller which comprises, for example, an operational amplifier configured to operate as a gain amplifier having a transfer function of $$-K\left(\frac{1+ST}{S}\right)$$

where S is a LaPlace operator, T is a time constant, and K is a gain constant. Furthermore, the current regulator 28 receives as an input control signal the difference or error signal between a current command signal I* and a current feedback signal $I_{FBK}$ appearing at the output of a summing junction 29. The signal $I_{FBK}$ is generated in a manner to be described. It is to be recognized, however, that other forms of the variable DC source can be used with equal facility insofar as the present invention is concerned. The thyristor converter 10 forming the variable DC source supplies a DC current $I_D$ to a force commutated thyristor inverter 30 by way of a DC link which comprises suitable conductors 32 and 33 and further including a reactor 34. A current transformer 35 shown connected to line 32 supplies a signal proportional to the DC current $I_D$ supplied to the inverter 30 and comprises the feedback signal $I_{FBK}$.

The inverter circuit 30 of FIG. 1 operates to convert DC to AC and includes six thyristors $36_1$ through $36_6$ arranged in a three phase bridge similar to that of the converter 10. However, the inverter 30 additionally includes respective series connected diodes $38_1$ through $38_6$ as well as six commutating capacitors $40_1$ through $40_6$ which are connected between each pair of diodes as shown. The gating of the thyristors $36_1$ through $36_6$ of the inverter 30 is provided by gating signals applied sequentially from a ring counter 42 (two connections being shown), for example, which is supplied with pulses from a suitable source such as a voltage controlled oscillator 44 which receives input control signal N* which comprises a frequency command signal. The output of the inverter 30 is taken from the bridge circuit junctions 46, 48 and 50 and is applied to a suitable three phase load 52, which is shown in FIG. 1 as an induction motor, by means of the lines 47, 49 and 51.

The force commutated inverter 30 comprises what is referred to as a current source inverter, also known as a controlled current inverter. While the arrangement shown in FIG. 1 is utilized for controlling an induction motor 52, it is also well known that a current source inverter, when inductively loaded, can also operate as a var generator to provide either lagging or leading vars (reactive volt-amperes) to compensate for the reactance of a load impedance connected to an AC source.

Figure 2:
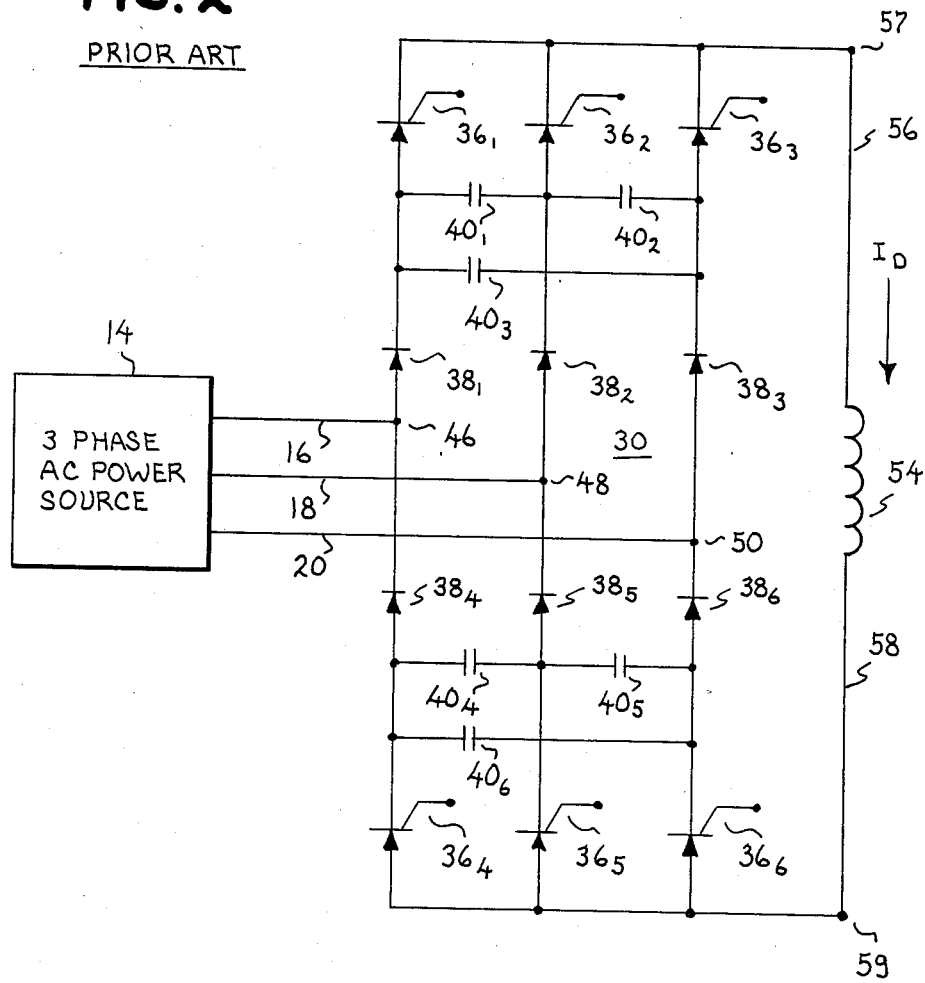
FIG. 2 is an electrical schematic diagram of the current source thyristor inverter of FIG. 1 utilized in a var generator system.

Accordingly, and now referring to FIG. 2, such a var generator is shown comprising the inverter 30 of FIG. 1 coupled directly to the AC source 14 by having the AC power lines 16, 18 and 20 connected to the circuit junctions 46, 48 and 50. Additionally, the current source inverter 30 is inductively loaded by means of an inductor 54 which is connected in shunt across the inverter by means of the conductors 56 and 58. This circuit configuration, moreover, is further shown and described in the above referenced related U.S. Pat. No. 4,496,899, "Control For A Force Commutated Current Source VAR Generator".

Briefly, the var generator shown in FIG. 2 is operable to generate both lagging and leading vars which can be explained in the following manner. If the circuit configuration of the inverter 30 were a simple bridge of six thyristors without the series diodes and commutating capacitors, it would simply operate as a controllable rectifier which provides a DC voltage across the output terminals 57 and 59 which is controlled by varying the delay in gating the thyristors $36_1$ through $36_6$. By gating the thyristors near 90° lagging; i.e., where the current lags the line voltage, a voltage of nearly zero volts will be generated, and the DC current $I_D$ in the inductor 54 can be controlled by slight changes, such as advances, in gating angle. With the diodes $38_1$ through $38_6$ and the commutated capacitors $40_1$ through $40_6$ being included, however, a turnoff capability for the thyristors is provided which permits gating over the total firing angle range of 0°–360°, and thus a source of leading vars is obtainable.

Figure 3A:
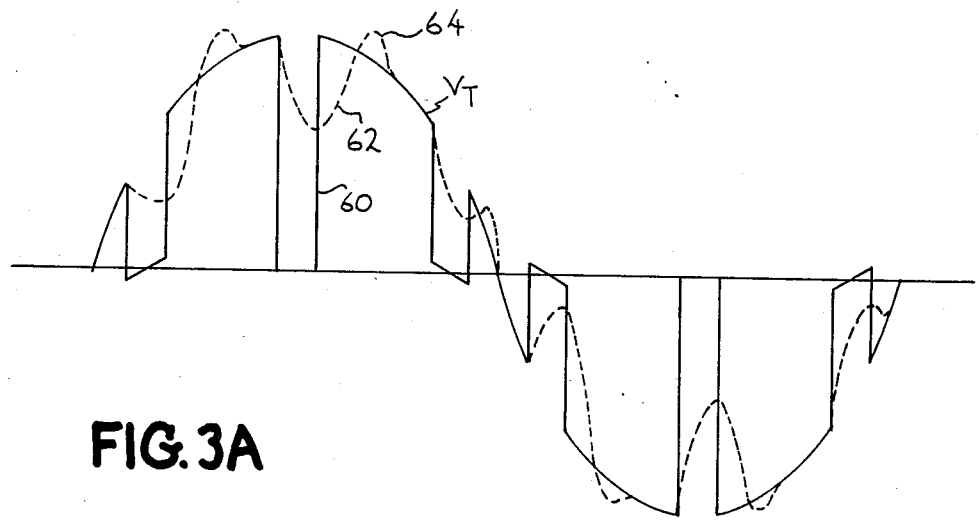
FIGS. 3A and 3B are line voltage waveform diagrams helpful in understanding the operation of the subject invention.
Figure 3B:
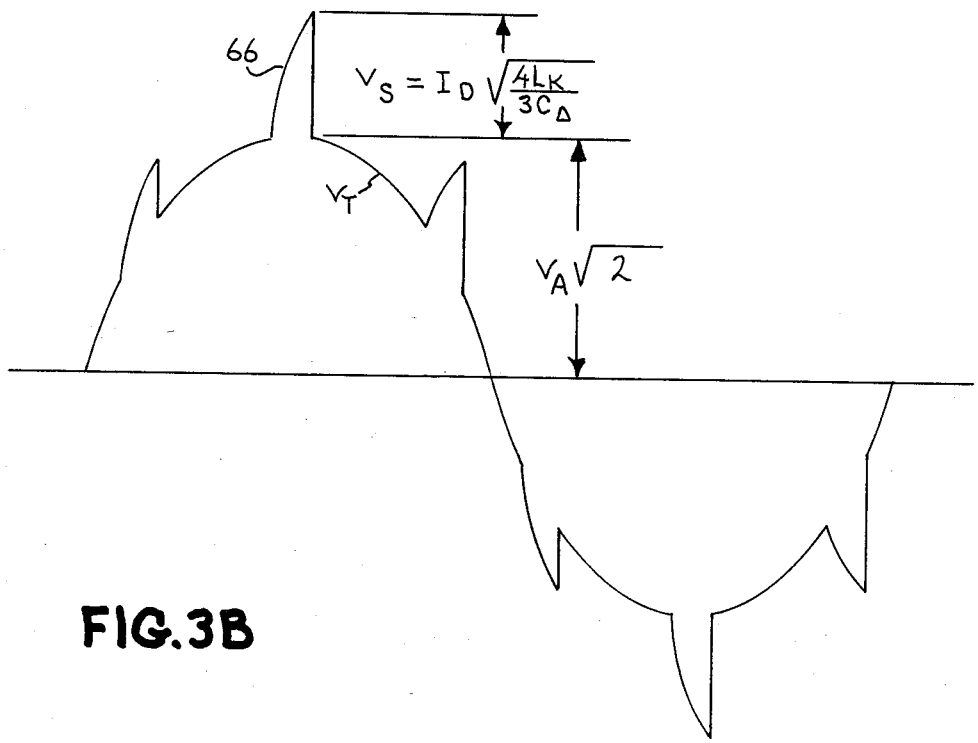

Referring now to FIGS. 3A and 3B, FIG. 3A is a waveform diagram illustrative of the source line-to-line voltage waveform $V_T$ which appears across the AC power lines 16, 18 and 20 of the current source var generator 30 shown in FIG. 2 in lagging operation. It is to be noted that the waveform is similar to the source voltage applied to any three phase thyristor bridge in that the voltage waveform exhibits notches at the times when the line current is commutated from one phase to another. Reference numeral 60 depicts one of the six notches per cycle represented in an idealized sense of the waveform $V_T$ whereas reference numeral 62 depicts the actual waveform of the notches with its inherent overshoot 64.

In leading operation as a var generator (FIG. 2) or when the inverter 30 operates in a motor driven system (FIG. 1), waveforms as shown in FIG. 3B are generated and the notches become spikes 66, the amplitudes $V_S$ of which are proportional to the DC current $I_D$ according to the relation:

$$V_S = I_D \sqrt{\frac{4L_K}{3C_\Delta}} \quad (1)$$

where $I_D$ is the current through inductor 34 of FIG. 1 or inductor 54 of FIG. 2, where $L_K$ is the line-to-neutral source or motor inductance and $C_\Delta$ is the capacitance of commutating capacitors $40_1 \ldots 40_6$. The peak voltage $V_{TH}$ across the thyristors $36_1$ through $36_6$ is same as the peak voltage of the source line-to-line voltage $V_T$ which is equal to the sum of the height of the voltage spikes $V_S$ and the crest of the line-to-line RMS voltage of the AC source voltage $V_A$ and accordingly can be expressed by the equation:

$$V_{TH} = V_A \sqrt{2} + I_D \sqrt{\frac{4L_K}{3C_\Delta}} \quad (2)$$

Thus, as shown in FIG. 3B, the first term of equation (2) is the peak line-to-line crest voltage while the second term is the height of the spike voltage caused by commutation. In the case of a motor drive the spikes are not necessarily centered on the crest of the wave, so expression (2) defines the worst case.

In view of the foregoing, it can be seen that the voltage limit on the thyristors $36_1$, $36_2 \ldots 36_6$ of the force commutated thyristor inverter 30 dictates the maximum current limit that the current source inverter 30 operating as a var generator (FIG. 2) can draw from the source 10 or that the inverter 30 operating as a motor drive (FIG. 1) can deliver to the motor 52 and comprises the current which causes the highest tolerable spike voltage $V_S$. By rearranging equation (2), a value of maximum current $I_{Dmax}$ which can be carried can be expressed as:

$$I_{DMAX} = (V_P - V_A \sqrt{2}) \times \sqrt{\frac{3C_\Delta}{4L_K}} \quad (3)$$

where $V_P$ is the peak voltage allowed on the thyristors. Equation (3), moreover, shows that in leading operation, the maximum current which can be carried is higher at relatively low source or motor voltages and is inversely proportional to the square root of the source impedance. Since the spikes do not occur in lagging operation, as evidenced by the waveform of FIG. 3A, the current which the current source inverter 30 can carry is not limited by thyristor voltage limits in lagging operation as it is in leading operation. Thus, a control feature becomes desirable which can limit the DC current $I_D$ so that the peak voltage $V_{TH}$ across the thyristors $36_1$ through $36_6$ defined by equation (2) does not exceed this limit. While a control configuration providing a "spillover current limit" could be utilized, this would waste rating of the current source inverter 30, since the current which the inverter can carry in lagging operation can be allowed to exceed the limit and thus such a current limit would waste potential rating of the var generator. In leading operation, including both var generator and motor drive operation, the current source inverter 30 is capable of more current when the source or motor voltage is low. This capability is useful in that it allows high current, hence high torque, in the motor at low speeds. In the var generator application, large leading currents are needed when source voltage is low in order to attempt to restore nominal voltage level. A fixed current limit which prevents thyristor overvoltage at high line or motor voltage would unnecessarily restrict the current at low voltage when large currents are needed.

Figure 4:
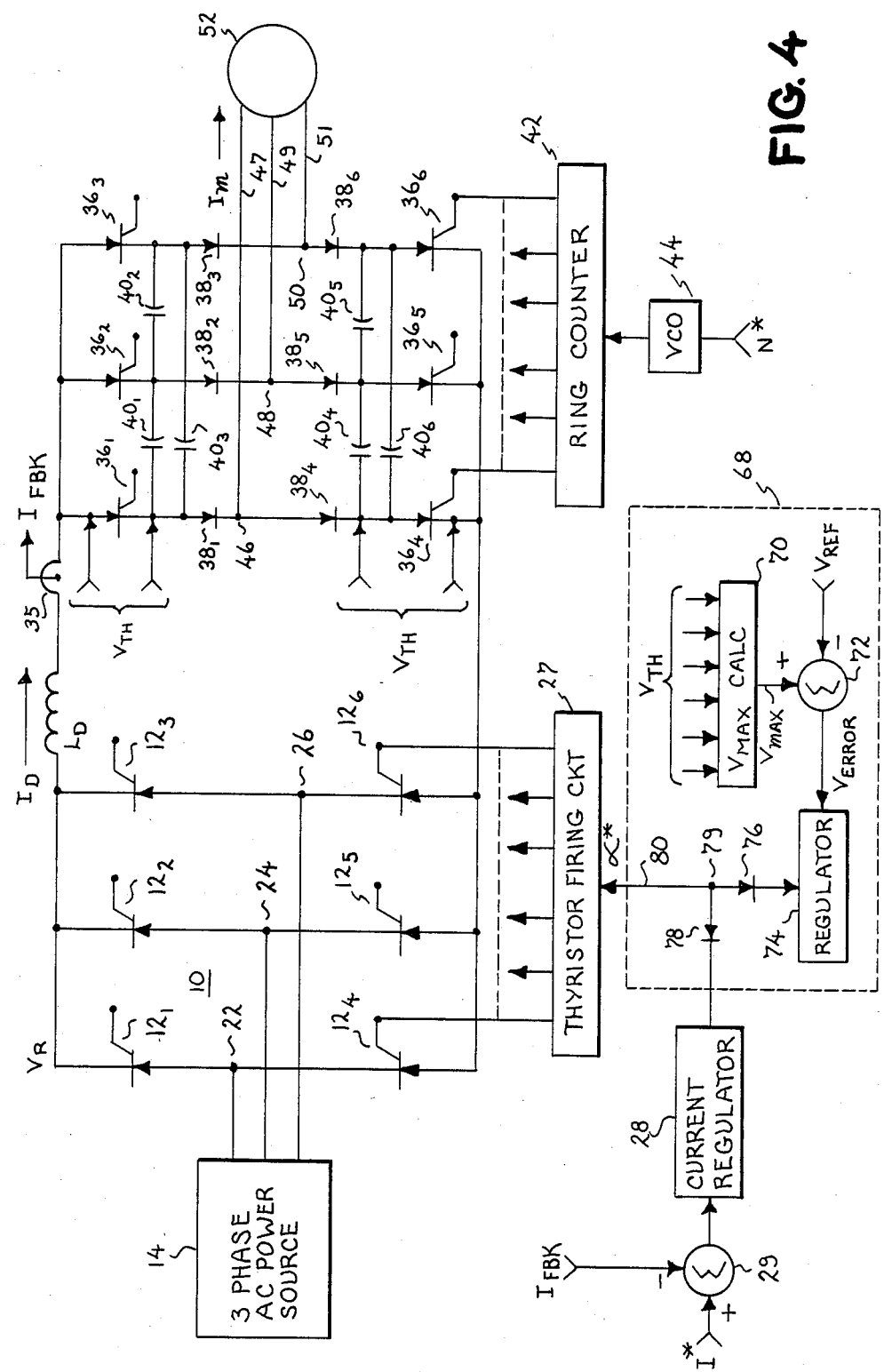
FIG. 4 is an electrical schematic diagram illustrative of a thyristor voltage limiter in accordance with the subject invention utilized in the controlled current inverter motor drive system of FIG. 1.

To this end, reference is now made to FIG. 4 which discloses the first embodiment of the invention for limiting thyristor voltage across the thyristors $36_1 \ldots 36_6$ of the current source inverter 30 utilized in a motor drive system of the type shown in FIG. 1. As shown in FIG. 4, thyristor voltage limiter circuit 68 is responsive to the voltage(s) $V_{TH}$ across each of the thyristors $36_1$ through $36_6$ of the inverter 30 and is operable to modify the angle command signal $\alpha^*$ applied to the thyristor firing circuit 27 controlling the source side converter thyristors $12_1$ through $12_6$. The limiter circuitry 68 more particularly includes a circuit 70 for sensing the voltage $V_{TH}$ across each of the six thyristors $36_1 \ldots 36_6$ and generating a signal proportional to the maximum value $V_{max}$ of the thyristor voltages sensed. The maximum value $V_{max}$ of the six sensed thyristor voltages is compared against a reference signal $V_{ref}$ by being applied to a summing junction 72. The output of the summing junction 72 comprises a difference or error signal $V_{error}$ between $V_{max}$ and $V_{ref}$, which error signal is applied to the input of a regulator circuit 74. The regulator circuit 74 is similar to and has a transfer function substantially the same as the current regulator 28 but is preferably of faster response than the regulator circuit 28. The outputs of the two regulator circuits 28 and 74 are coupled to the input of the source side thyristor firing circuit 27 by means of a diode takeover circuit, including the diodes 76 and 78 commonly connected at junction 79 to input circuit lead 80 shown conected to the thyristor firing circuit 27. The diode takeover circuit operates to cause the angle command signal $\alpha^*$ to be generated or at least modified to allow the gating angle $\alpha$ to be under that control calling for the least current $I_D$ in the inverter 30, i.e., the latest gating angle.

Figure 5:
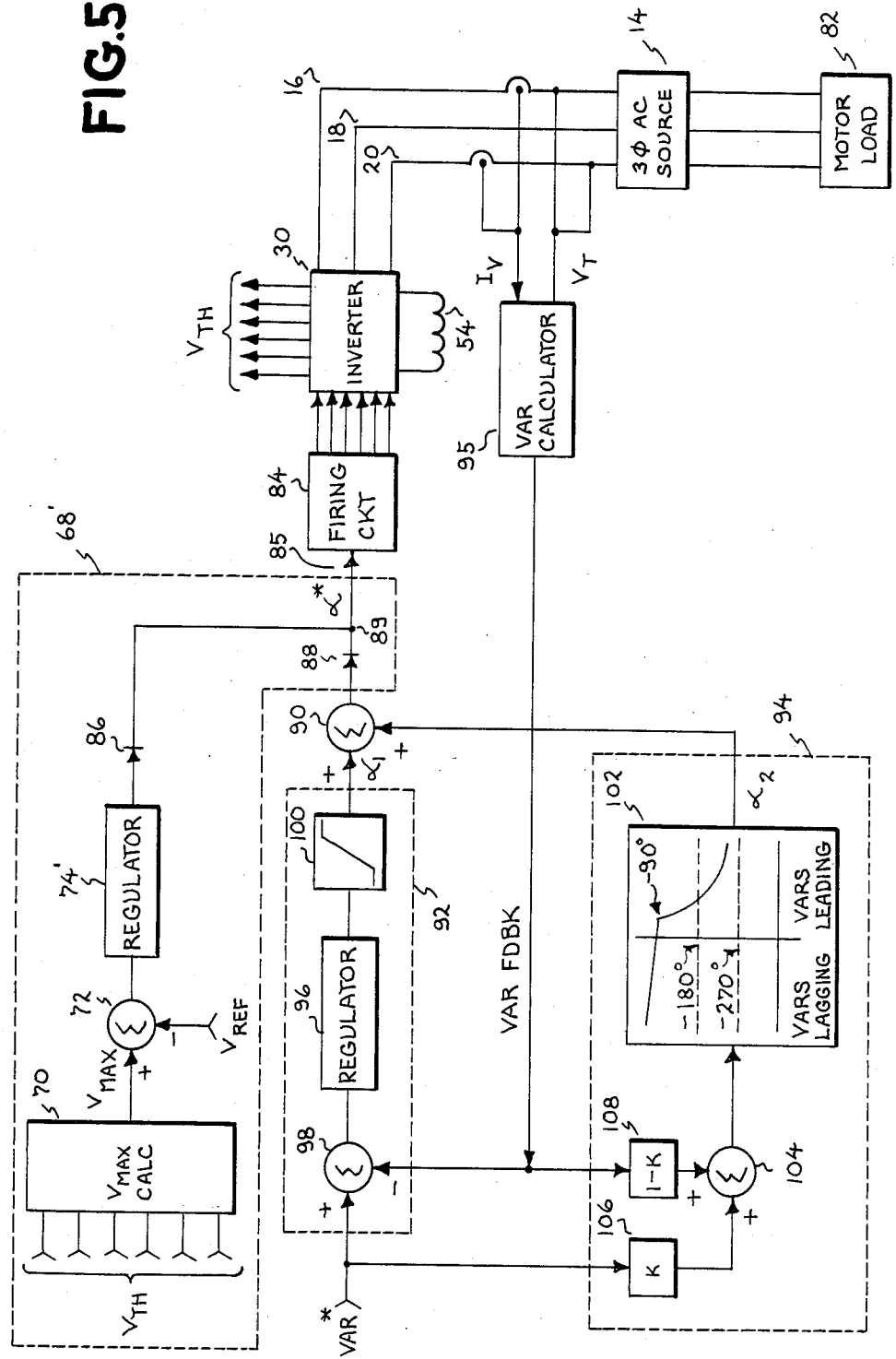
FIG. 5 is an electrical schematic diagram of a thyristor voltage limiter in accordance with the subject invention utilized in the current source inverter var generator system of FIG. 2.
Figure 6:
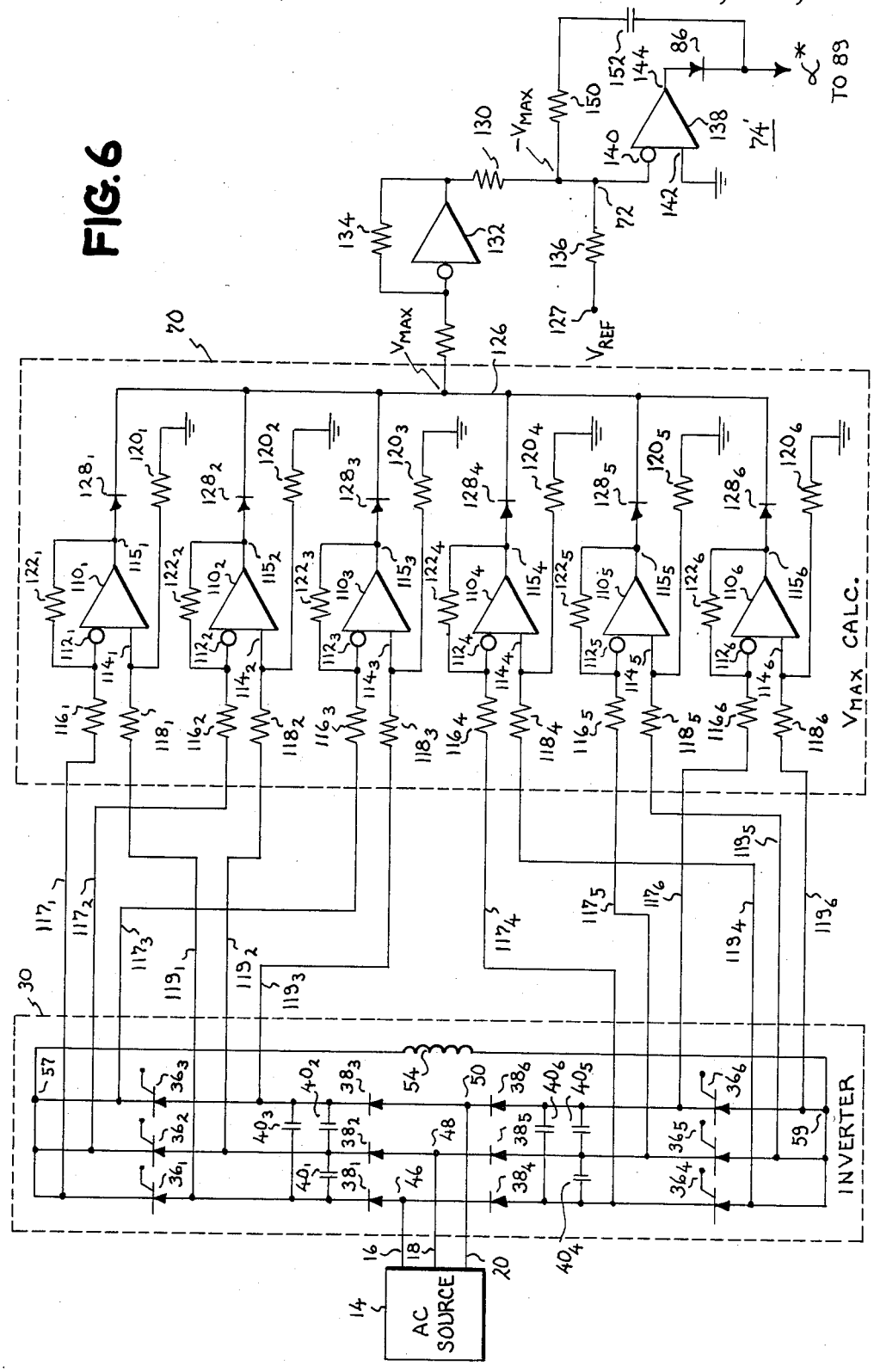
FIG. 6 is an electrical schematic diagram illustrative of the preferred embodiment of the thyristor voltage limiter circuitry utilized in the systems of FIGS. 4 and 5.

Circuit details for implementing the thyristor voltage limiter 68 are shown in FIG. 6. However, prior to discussing such details, reference will now be made to FIG. 5 wherein there is shown thyristor voltage limiter circuitry, in accordance with the subject invention, utilized in a var generator system and more particularly in a var generation system of the type shown and described in the above cross-referenced U.S. Pat. No. 4,496,899, "Control For A Force Commutated Current Source VAR Generator".

With reference to FIG. 5, the AC source 14 supplying an AC load 82 which may be, for example, a motor load, is coupled to the thyristor inverter 30 by means of power lines 16, 18 and 20. The inverter 30, moreover, has the gating angles of the thyristors $36_1$ through $36_6$ controlled by a firing circuit 84 which is responsive to the firing angle command signal $\alpha^*$ which appears on circuit lead 85. As in the earlier embodiment of FIG. 4, the angle command signal $\alpha^*$ comprises an angle command signal generated, or at least modified, by a diode takeover circuit similar to that shown in FIG. 4, and includes diodes 86 and 88 commonly coupled at junction 89 and respectively coupled at their opposite ends to the regulator circuit 74' of the thyristor voltage limiter circuit 68' and the output of a summing junction 90.

The output of summing junction 90 comprises the primary angle command signal resulting from a first signal being generated by a linear feedback circuit 92 and a second signal generated by a non-linear feed-forward control circuit 94. The feedback circuit 92 is operable to essentially control the generation of a firing angle signal $\alpha_1$ in response to the error between a var command signal VAR* and a var feedback signal VAR FDBK, whereas the feed-forward circuit 94 is operable to essentially control the generation of a firing angle signal $\alpha_2$ in response to the sum of the same VAR* and VAR FDBK signals. The VAR FDBK signal is generated by a VAR calculator circuit 95 which can be configured substantially like a conventional two watt meter arrangement which is responsive to two of the line currents $I_V$ and two of the line voltages $V_T$ appearing, for example, on lines 16 and 20.

As described U.S. Pat. No. 4,496,899, the operating characteristics of the inverter 30 for lagging vars is substantially linear, while the operating characteristic for leading vars is non-linear. Accordingly, the linear feedback circuit 92 includes a linear regulator circuit 96 having an input signal which comprises a difference signal between the var command signal VAR* and the var feedback signal VAR FDBK and further comprises the output of summing junction 98 to which these signals are applied. The regulator circuit 96 comprises, preferably, a proportional plus integral type controller of the type referred to above with respect to the current regulator 28 shown in FIG. 1. The output of the regulator 96 is fed to a signal clamp 100 which limits the variable output of the regulator 96.

The feed-forward circuit 94, on the other hand, includes a non-linear active network 102 which is designed to have a signal transfer function which matches the actual static operating characteristic of the inverter 30, particularly the non-linear characteristic for leading vars generation. The network 102 is responsive primarily to the var command signal VAR*, but is also responsive to the var feedback signal VAR FDBK. Accordingly, the var command signals VAR* and the var feedback signal VAR FDBK are applied to a summing junction 104 by respective signal translation devices 106 and 108 which have signal gain transfer functions to scale the signals applied thereto by K and 1-K, where K ranges between 0.5 and 1.0. If K is equal to unity, then the function of the signal translation device 106 would be to provide to summing junctions 104 the proper value of gating angle alpha corresponding to the VAR*. In order to maintain similar dynamic response in both leading and lagging operation, it is necessary to restrict the dynamic operation of the non-linear network 102 inasmuch as the transfer function includes a very high gain region near zero vars in the leading quadrant. This high gain can provide relatively high gain angle commands for small changes in var command in this region. This effect is offset by supplying an input signal to the network 102 which comprises the var command signal VAR* and the var feedback signal VAR FDBK. In steady state when the var command signal VAR* and the var feedback signal VAR FDBK are substantially alike, the composite input signal to the network 102 is equal to the operating point dictated by the var command signal VAR* and the output $\alpha_2$ therefrom is set at the appropriate firing angle command $\alpha^*$. When the var command signal VAR* moves dynamically and the var generator 30 has not yet responded, the forcing function provided by the non-linear network 102 is reduced by the factor K. By setting the scaling factors of K and 1-K at proper magnitudes, typically K=0.75 and 1-K=0.25, the transient response in leading operation can be made similar to that of lagging operation so that the overall transient response is substantially uniform at all operating points.

The control provided by the combination of the linear feedback circuit 92 and the non-linear feed-forward circuit 94 of FIG. 5 results in a regulation of reactive volt-amperes (vars) rather than DC current. If DC current through the inductor 54 were regulated, the control of the firing circuit 84 would have to have a reversal of sense at the transition from leading to lagging operations and thus would be difficult to operate at zero vars. Furthermore, the use of a combination of non-linear feed-forward control and linear feedback control provides precise control that is fast responding, linear and stable.

The embodiment of FIG. 5 also includes a thyristor voltage limiter 68' which is similar to the thyristor voltage limiter 68 shown in FIG. 4 in that the voltages $V_{TH}$ appearing across each of the thyristors $36_1, 36_2 \ldots 36_6$ (FIG. 2) of the inverter 30 are applied to a circuit 70 for sensing and calculating the maximum voltage $V_{max}$ of the thyristor voltages and which is then compared against a reference voltage $V_{ref}$ at the summing junction 72. The difference is applied to the regulator circuit 74'. The two thyristor voltage limiters 68 and 68' are essentially the same, the only difference being that in the motor drive system of FIG. 4 the polarity of the diodes 76 and 78 is reversed with respect to the diodes 86 and 88 as shown in FIGS. 4 and 5, respectively and the transfer function of regulator 74' does not have the minus sign characteristic of the regulators 28 and 74. As a result, the firing circuit 84 operates to cause the angle command signal $\alpha^*$ to be under that control calling the earliest gating angle.

With the foregoing in mind, reference is now made to FIG. 6 where there is disclosed the details of the circuitry for implementing the thyristor voltage limiter 68' of FIG. 5. As shown, the thyristor inverter 30 is illustrated connected to the AC source 14 by means of the power leads 16, 18 and 20 being connected to circuit junctions 46, 48 and 50. The circuitry 70 for sensing and determining the maximum value of the voltages across each of the inverter thyristors $36_1$ through $36_6$ is shown as including six differential amplifiers configured by means of the operational amplifiers $110_1$ through $110_6$. Each operational amplifier includes an inverting input and a non-inverting input $112_1$ and $114_1$, $112_2$ and $114_2$, etc. which are respectively coupled across first and second power electrodes; i.e., the cathode and anode of the respective thyristors $36_1$ through $36_6$. Coupling is made by means of fixed resistors $116_1$ through $116_6$ and respective connecting leads $117_1$ through $117_6$ coupled to the cathodes of the the thyristors while fixed resistors $118_1$ through $118_6$ and connecting leads $119_1$ through $119_6$ are coupled to the anodes of the thyristors. Feedback resistors $122_1, 122_2 \ldots 122_6$, moreover, are connected between the outputs $115_1, 115_2 \ldots 115_6$ to the respective inverting inputs $112_1$ through $112_6$. The operational amplifiers thus configured provide respective difference output signals at the outputs $115_1$ through $115_6$ and operate substantially the same as the circuits shown and described in U.S. Pat. No. 4,251,763, entitled, "Commutating Capacitor Charged Detection Circuit And Method", issued to Loren H. Walker and John H. Cutler on Feb. 17, 1981. The positive cycles of the difference output signals from the six operating amplifiers $110_1$ through $110_6$ are respectively coupled to and combined at a common circuit node 126 by half wave rectifier diodes $128_1$ through $128_6$. Moreover, the signal level at the circuit node 126 comprises the maximum value $V_{max}$ of all the half wave rectified AC voltages across the inverter thyristors $28_1$ through $28_6$.

Further as shown in FIG. 6, the signal $V_{max}$ appearing at circuit node 126 is compared against the reference voltage $V_{ref}$ applied to terminal 127 by being coupled to the summing junction 72 by means of a fixed summing resistor 130, as well as a signal inverting operational amplifier 132 which has a feedback resistor 134. The reference voltage $V_{ref}$ is applied to the summing junction 72 by means of the summing resistor 136. The regulator 74 is shown including an operational amplifier 138 whose inverting input 140 is directly connected to the summing junction 72 while its non-inverting input 142 is connected to ground. The transfer function of the regulator 74 is determined by the feedback network coupled between the output 144 of the operational amplifier 138 and its inverting input 140. The network is comprised of a series circuit connection including a fixed resistor 150 and the fixed capacitor 152. The output of the operational amplifier 138 is coupled through diode 76 to circuit junction 79 of FIG. 4 or diode 86 coupled to circuit junction 89 of FIG. 5. Furthermore, the resistor 150 and the capacitor 152 are connected from the aforementioned circuit junction back to the summing junction 72. In operation, the summing junction 72 provides an output voltage which is the difference between the signals $-V_{max}$ and $V_{ref}$ which when applied to the inverting input 140, drives the operational amplifier 138. However, the feedback network is designed such that a positive signal appears at the output 144 when the value of $V_{max}$ reaches a predetermined safe limit which output signal is further applied to the firing circuit 27 of FIG. 4 or the firing circuit 84 of FIG. 5 to adjust the gating angle in a direction to reduce current.

The same circuit as shown in FIG. 6 can fulfill the function of voltage limiter 68 in FIG. 4 if diode 86 is reversed to become diode 76 and the signal inversion provided by inverter 132 acts on the signal $V_{ref}$ instead of the signal $V_{max}$. This allows full utilization of the inverter 30 in both motor drive and var generator applications and requires no adjustment for source or motor impedance, voltage of the line or motor, or commutation capacitance. The setting is established by the thyristor voltage capability and needs no adjustment to accommodate the parameters of the system with which it is utilized.

The protective voltage limiter circuit disclosed in this invention, moreover, is a fast acting regulator which is not only stable, but can operate continuously if required to hold the current source inverter 30 at its maximum leading capability. Furthermore, the regulator does not need to be defeated in lagging operation because the voltages will not exceed the limit in lagging operation due to the absence of spikes on the voltage waveform across the thyristors.

The only difference in the application of the voltage limiter in accordance with this invention is that in the motor drive system application, the current is controlled by control of the gating angle of the thyristors of the source side converter 10, while the voltage spikes occur on the load side inverter 30. Accordingly, voltage is sensed on the inverter thyristors $36_1 \ldots 36_6$ and the gating angle is changed on the source side converter thyristors $12_1 \ldots 12_6$. In the source side converter 10, current is reduced by delaying the source side thyristor gating angle and hence the polarity of the diodes 76 and 78 are reversed from those in the var generator application, namely diodes 86 and 87 in order that the firing circuit will respond to more lagging commands.

While there have been shown and described what are at present considered to be the preferred embodiments of the invention, it should be noted that when desirable this control can be implemented in a digital computing controller. Accordingly, this and other modifications thereto will readily occur to those skilled in the art. It is not desired, therefore, that the invention be limited to the specific arrangements shown and described, but it is intended to cover in the appended claims all such modifications as fall within the true spirit and scope of the invention.

I claim:

1. A control circuit for protecting the controlled rectifiers of an electrical power inverter comprising:
    (a) a force commutated current source inverter including a plurality of controlled rectifier devices having first and second power electrodes;
    (b) means for sensing the voltage across the first and second power electrodes of at least one of said controlled rectifier devices;
    (c) means for comparing the sensed voltage across said first and second power electrodes against a reference voltage corresponding to a signal proportional to a safe operating voltage for said controlled rectifier devices and generating a control signal therefrom; and
    (d) means responsive to said control signal for controlling the current within said inverter to thereby prevent an increase in the voltage across said power electrodes above said reference voltage.

2. The control circuit of claim 1 wherein said plurality of controlled rectifier devices comprise a plurality of thyristors, and
    wherein said means (b) for sensing comprises means for sensing the voltage across each of said thyristors.

3. The control circuit of claim 1 wherein said plurality of controlled rectifier devices comprise a plurality of thyristors,
    wherein said means (b) for sensing comprises means for sensing the highest voltage across each of said thyristors, and
    wherein said means (c) for comparing comprises means for comparing said highest voltage against said reference voltage and generating a control signal comprising the difference therebetween.

4. The control circuit of claim 3 wherein said current source inverter comprises a DC to AC power inverter coupled to a motor load and operating to drive said motor load.

5. The control circuit of claim 4 and wherein said means (d) for controlling current comprises: (i) an AC to DC power converter coupled to and supplying current to said inverter by a DC link circuit, and (ii) means responsive to said control signal for controlling said power converter to vary the current supplied to said inverter in accordance with the difference between said highest voltage and said reference voltage.

6. The control circuit of claim 5 wherein said power converter includes a plurality of controlled rectifier devices coupled to an alternating current source and wherein said means (ii) for controlling said power converter comprises means for controlling the firing angle of said controlled rectifiers.

7. The control circuit of claim 6 wherein said plurality of controlled rectifier devices of said power converter comprise a plurality of thyristors.

8. The control circuit of claim 3 wherein said current source inverter (a) comprises an inductively loaded thyristor inverter coupled to an alternating current source and operating as a current source var generator.

9. The control circuit of claim 8, and
wherein said means (d) for controlling current comprises means for controlling the firing angle of said thyristors of said inverter for controlling vars.

10. The control circuit of claim 3 wherein said thyristors include anode and cathode electrodes and said means (b) for sensing the highest voltage across each of said thyristors comprises: (i) means for providing respective difference signals proportional to the voltage across the anode and cathode electrodes of each of said thyristors, and (ii) means for combining said difference signals at a common circuit node to provide a signal proportional to said highest voltage.

11. The control circuit of claim 10 and further comprising: (iii) rectifier means connected between said means for providing respective difference signals and said common circuit node.

12. The control circuit of claim 11 wherein said means (i) for providing respective difference signals comprises a respective differential amplifier having first and second input terminals coupled across one thyristor of said plurality of thyristors, and
wherein said rectifier means (iii) comprises a respective half-wave rectifier connected between each differential amplifier and said common circuit node.

13. The control circuit of claim 3 and wherein said means (d) for controlling current additionally includes regulator circuit means for limiting the current in said inverter to a predetermined limit.

14. The control circuit of claim 13 wherein regulator circuit means comprises an operational amplifier having a predetermined controller type transfer function.

15. The control circuit of claim 3 wherein said current source inverter (a) comprises a DC to AC power inverter coupled to a motor load and operating to drive said motor load,
wherein said means (d) for controlling current includes an AC to DC power converter coupled to and supplying current to said inverter by way of a DC link, and means responsive to said control signal for controlling said power converter to vary the current supplied to said inverter in accordance with said control signal,
wherein said thyristors of said inverter include anode and cathode electrodes and said means for sensing the highest voltage across each of said thyristors of said inverter includes means for providing respective difference signals proportional to the voltages across the anode and cathode electrodes of said thyristors and means for combining said difference signals at a common circuit node to provide a signal proportional to said highest voltage, and
wherein said means (d) for controlling current additionally includes regulator circuit means coupled to said signal proportional to said highest voltage for limiting the current in said inverter to a predetermined limit.

16. The control circuit of claim 15 wherein said power converter includes a plurality of thyristors coupled to an alternating current source and wherein said means for controlling said power converter comprises means for controlling the firing angle of the thyristors of said converter in response to said control signal.

17. The control circuit of claim 16 wherein said means for controlling the firing angle of the thyristors of said converter additionally comprise: (i) a thyristor firing circuit for firing the converter thyristors at a predetermined firing angle; (ii) means including another regulator circuit means for controlling the firing angle of the thyristor firing circuit in response to a current command signal; and (iii) means coupling said current command signal and said control signal to said thyristor firing circuit whereby both said signals operate to control said firing angle.

18. The control circuit of claim 17 wherein said coupling means (iii) comprises a diode takeover circuit respectively coupled between both said regulator circuit means and said thyristor firing circuit for controlling thyristor firing angle in response to which of said current command signal and said control signal calls for the latest thyristor firing angle.

19. The control circuit of claim 3 wherein said current source inverter (a) comprises an inductively loaded force commutated thyristor inverter coupled to an alternating current source and operating as a current source var generator,
wherein said thyristors include anode and cathode electrodes and said means (b) for sensing the highest voltage across each of said thyristors of said inverter includes means for providing respective difference signals proportional to the voltage across the anode and cathode electrodes of each of said thyristors and means for combining said difference signals at a common circuit node to provide a signal proportional to said highest voltage,
wherein said means (d) for controlling current additionally includes regulator means and means for controlling the firing angle of said thyristors coupled to and being responsive to said control signal, for limiting the current in said inverter to a predetermined limit by controlling the firing angle of said thyristors.

20. The control circuit of claim 19 wherein said means for controlling the firing angle of said thyristors comprises a thyristor firing circuit for firing the inverter thyristors at a predetermined firing angle, and wherein said means (d) additionally includes means providing a var command signal, another regulator circuit means for controlling the firing angle of the thyristor firing circuit in response to said var command signal, and means coupling said var command signal and said control signal to said thyristor firing circuit.

21. The control circuit of claim 20 wherein said coupling means comprises a diode takeover circuit respectively coupled between both said regulator circuit means and said thyristor firing circuit for controlling thyristor firing angle of said inverter in response to which of said var command signal and said control signal calls for the earliest thyristor firing angle.

22. A method for protecting the controlled rectifiers of a force commutated current source inverter including a plurality of controlled rectifier devices and comprising the steps of:

(a) sensing the voltage across first and second power electrodes of at least one of said plurality of controlled rectifier devices;

(b) comparing the sensed voltage across said first and second power electrodes against a reference voltage corresponding to a signal proportional to a safe operating voltage for said controlled rectifier devices and generating a control signal therefrom; and (c) controlling the current within said inverter in response to said control signal to prevent an increase in the voltage across said power electrodes above said reference voltage.

23. The method of claim 22 wherein said plurality of controlled rectifier devices comprise a plurality of thyristors, and wherein said sensing step (a) comprises the step of sensing the voltages across each of said thyristors.

24. The method of claim 22 wherein said plurality of controlled rectifier devices comprise a plurality of thyristors, wherein said step (a) of sensing comprises the steps of sensing the highest voltage across each of said thyristors, and wherein said step (b) of comparing comprises the step of comparing said highest voltage against said reference voltage and generating a control signal comprising the difference therebetween.

25. The method of claim 24 wherein said current source inverter comprises a DC to AC power inverter coupled to an AC to DC power converter by means of a DC link and operating to drive a motor load and wherein said step (c) of controlling current comprises the step of controlling said power converter to vary the current supplied to said inverter in accordance with said control signal.

26. The method of claim 25 wherein said power converter includes a plurality of thyristors coupled to an alternating current source and wherein said step of controlling said power converter comprises the step of controlling the firing angle of said thyristors of said power converter.

27. The method of claim 24 wherein said current source inverter comprises an inductively loaded force commutated thyristor inverter coupled to an alternating current source and operating as a current source var generator, and wherein step (c) for controlling current comprises the step of controlling the firing angle of said thyristors of said inverter for controlling vars.

28. The method of claim 24 wherein said thyristors include anode and cathode electrodes and said step (b) of sensing the highest voltage across each of said thyristors comprises the steps of providing respective difference signals proportional to the voltage across the anode and cathode electrodes of each of said thyristors and combining said respective difference signals at a common circuit node to provide a signal proportional to said highest voltage.

29. The method of claim 28 wherein said combining step additionally comprises the steps of rectifying said respective difference signals and coupling the respective rectified signals to said common circuit node.

30. The method of claim 29 wherein said step of rectifying comprises half-wave rectifying said respective difference signals.

31. The method of claim 29 and wherein said step (c) of controlling current additionally includes the step of regulating the current in said inverter and limiting said current to a predetermined value.

32. The method of claim 26 wherein said step of controlling the firing angle of the thyristors of said converter additionally includes the step of controlling the firing angle of said thyristors in response to a current command signal, and controlling said firing angle in response to both said current command signal and said control signal.

33. The method of claim 32 and additionally including the step of controlling thyristor firing angle in response to the current command signal and the control signal calling for the latest thyristor firing angle.

34. The method of claim 27 wherein said step of controlling the firing angle of the thyristors of said inverter additionally includes the step of controlling the firing angle of said thyristors in response to a var command signal, and controlling said firing angle in response to both said var command signal and said difference signal.

35. The method of claim 34 and additionally including the step of controlling thyristor firing angle in response to which of said var command signal and control signal calls for the earliest thyristor firing angle.

* * * * *